Aug. 31, 1948.     B. M. BECKER ET AL     2,448,135
SEPARATION OF SUSPENDED SOLIDS FROM FLUIDS
Filed Oct. 25, 1943                     3 Sheets-Sheet 1

Inventors:
Bernard M. Becker
Jerry McAfee
By: Lee J. Gary
Attorney.

Patented Aug. 31, 1948

2,448,135

UNITED STATES PATENT OFFICE 2,448,135

SEPARATION OF SUSPENDED SOLIDS FROM FLUIDS

Bernard M. Becker, Chicago, and Jerry McAfee, Riverside, Ill., assignors to Universal Oil Products Company, Chicago, Ill., a corporation of Delaware Application October 25, 1943, Serial No. 507,490

3 Claims. (Cl. 196—52)

This application is a continuation-in-part of our co-pending application Serial No. 470,274, filed December 26, 1942, now abandoned, which is a continuation-in-part of our co-pending application Serial No. 426,312, filed January 10, 1942, now abandoned.

The invention relates to an improved method and means for effecting the separation of finely divided solids, such as dust or powder from a stream of fluid, such as vapor, gas or vapor-gas mixture in which the solid particles are suspended.

The invention will find wide application in industry and it is therefore not limited to use in conjunction with any particular process nor to the separation of any particular subdivided solid material from any specific fluid. However, its features are particularly advantageous as applied to the separation and recovery of valuable powdered solids, such as catalyst fines, for example, from vaporous and/or gaseous products of the process in which the catalyst is employed. One such conversion process now in use in the oil refining industry is the catalytic cracking of hydrocarbon oils in a system known as the "fluid bed" type. The fluid bed type of operation is also being applied to hydrocarbon conversion reactions other than cracking and its usefulness in the field of hydrocarbon conversion reactions generally is being rapidly extended. This type of the process has therefore been chosen to specifically illustrate an advantageous application of the features of the invention.

In the fluid bed type of operation as applied to catalytic cracking, a bed of finely divided solid cracking catalyst is maintained within a vertically elongated confined reaction zone and the hydrocarbon oil to be cracked is passed in heated essentially vaporous state upwardly into the reaction zone at a sufficient velocity that the bed of catalyst particles is kept in a turbulent fluid-like state by the upwardly flowing vaporous hydrocarbon reactants and resulting conversion products. The catalyst particles in the reaction zone become contaminated by the deposition thereon of deleterious heavy conversion products of a carbonaceous or hydrocarbonaceous nature and, to keep the catalyst active for promoting the cracking reaction, it is continuously regenerated in a separate confined regenerating zone to which a steam of catalyst from the reaction zone is continuously transported and wherefrom a stream of hot regenerated catalyst is continuously returned to the reaction zone. Regeneration is accomplished by contacting the bed of catalyst maintained in the regenerating zone with an upwardly flowing stream of oxygen-containing gas under conditions regulated to burn the combustible contaminants and keep the catalyst bed in turbulent fluid-like condition.

In operations of this type, considerable quantities of finely divided catalyst particles remain suspended in the outgoing streams of conversion products and spent or partially spent reactivating gases leaving the respective reaction and regenerating zones. It is common practice to pass the outgoing vapors and/or gases through cyclone separators in which a substantial portion of the suspended solid catalyst particles are centrifugally separated and wherefrom the separated catalyst particles are returned to the fluid beds. However, even when several cyclone separating steps are employed in series, an appreciable quantity of catalyst fines remain suspended in the vaporous and gaseous stream discharged therefrom and numerous schemes involving, for example, the use of electrostatic precipitators, scrubbing of the vapors with charging oil for the process and the like have been proposed for recovering substantially all or a major portion of the remaining catalyst fines.

The invention provides an effective, simple and advantageous method and means for the continuous recovery of catalyst fines in a system of the type above outlined and for returning the recovered fines to the system for further use in promoting the reaction.

In accordance with our invention, the vaporous and/or gaseous stream in which the finely subdivided solid material is suspended is passed in contact with a moving bed of larger solid particles which serves as a filter for removing the suspended finer particles from the stream. The resulting mixture of fine and larger solid particles is supplied from the filtering zone to a stripping zone in which a bed of the solid particles is maintained in agitated condition by passing a stripping fluid upwardly therethrough to remove the fine particles from the coarser particles by suspending the former in the stripping fluid. As applied to catalytic cracking and other operations of the fluid bed type, the stripping fluid, with the recovered catalyst fines suspended therein, is returned to the fluid bed in the reaction or regenerating zone, thereby returning the recovered catalyst particles to the system for further use.

We realize that operations of a type similar in some respects to that herein provided have been proposed for the separation or recovery of finely divided solids from a gaseous stream in which the solid particles are suspended. However, we have found that such filtering operations are workable only when the filter bed is in relative movement of the individual particles comprising the bed, as distinguished from general movement of the entire bed through the filtering zone. Also, stripping is only accomplished when the bed of solid particles in the stripping zone is in an agitated or turbulent state resembling, for example, that of a boiling liquid. We have further found that there is a rather sharp and critical demarkation between the quiescent condition required in the filtering zone and the agitated condition required in the stripping zone. The condition of the bed with respect to agitation or quiescence of the particles composing the same is a function of the density and average size of the particles, the superficial linear velocity of the gas or other fluid passing through the bed and the nature of the fluid. With the other conditions fixed, there is a "first critical velocity" for the fluid at which the solid particles comprising the bed begin to be agitated. A velocity lower than this critical value will cause the bed to act as a filter to collect fines from the fluid passing therethrough while a velocity above this critical value will effect the stripping of fines from the bed.

We have conducted tests with various forms and types of subdivided materials to determine the accuracy of our previous observations with respect to the critical nature of the relatively quiescent or agitated condition of a bed of such material in relation to the velocity of the fluid passed therethrough. Employing alumina granules, for example, ranging from 10 to 60 mesh size and employing dry air at room temperature and atmospheric pressure, as the fluid, the "first critical velocity," as defined above, can be determined by the empirical equation:

$$V_{Oc1} = 1410(Dp)^{1.24}$$

where $V_{Oc1}$ = the superficial first critical velocity as defined above in feet per second.

$Dp$ = the average diameter of the solid particles in feet.

Applying this formula it will be found, for example, with alumina granules of 30 mesh size, fines will be stripped from the bed in dry air at room temperature when the superficial linear velocity of the air is greater than 0.61 foot per second, at which velocity the granules comprising the bed become agitated. With a linear velocity below this figure, fines in the incoming air stream will be filtered therefrom in the bed.

The foregoing information with respect to what we term, for convenience, the "first critical velocity" of the fluid is given for the purpose of concisely illustrating what is meant by this term. A more general formula for determining the first critical velocity, which is applicable to any size and type of subdivided solid material, as well as any type of fluid, and a wide range of temperature and pressure conditions is not considered necessary to a clear understanding of the invention nor to determine the velocities which should be used in the filtering and stripping zones for conducting the process provided by the invention. To determine the proper velocity in the filtering zone, the rate at which the incoming fluid containing the finely subdivided solid material which is to be separated therefrom is supplied to the filtering zone should be adjusted until visual observation of the bed reveals that the particles remain relatively static with respect to each other. With this condition in the bed it will be found that little or no fine material exists in the outgoing fluid stream discharged from the filtering zone. The rate at which stripping fluid is supplied to the stripping zone is adjusted until visual inspection of the bed reveals that the solid particles are in agitated or fluidized condition, and when this condition is reached it will be found that fines are stripped from the bed and included in the stream of fluid discharged from the upper portion thereof and that the larger particles of subdivided solid material passing from the lower portion of the stripping zone to the filtering zone are substantially free of fines.

The features and advantages of the invention will be more apparent with reference to the accompanying diagrammatic drawing and the following description thereof.

Figure 1:
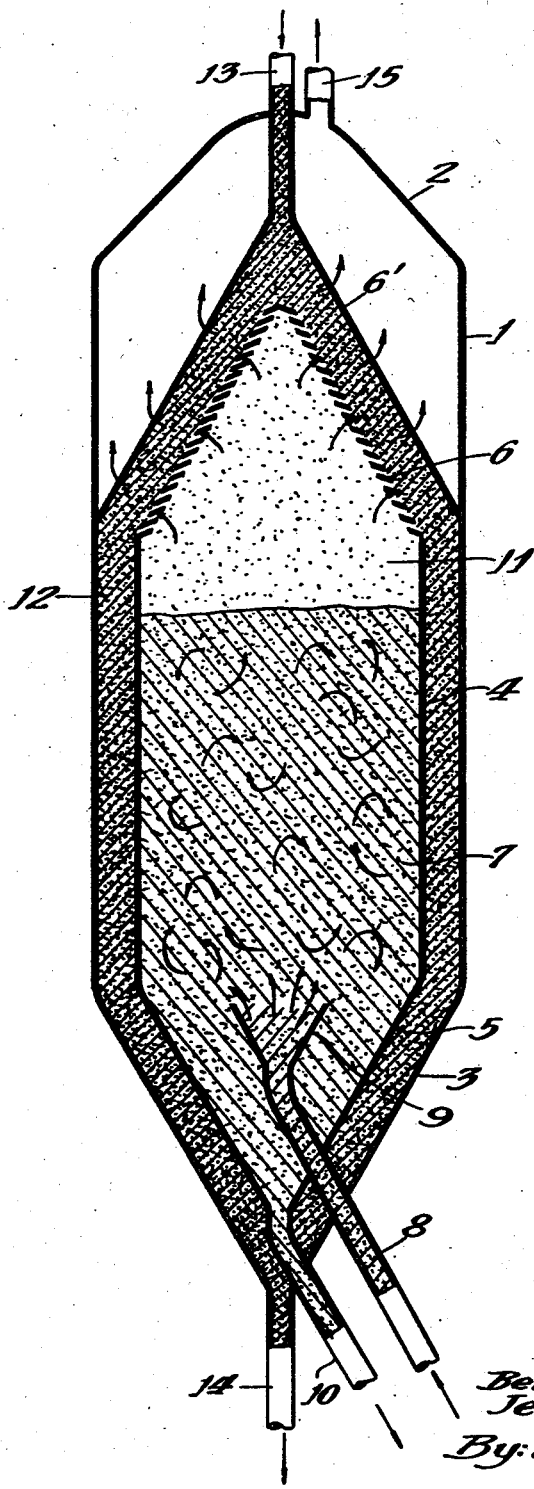
Fig. 1 is an elevational view, shown principally in section, of one specific form of apparatus embodying the features of the invention and in which the improved filtering process provided by the invention may be conducted.

Referring now to Fig. 1, the apparatus illustrated which may be employed either as a regenerator or reactor, comprises an outer shell 1, closed at its upper and lower end, respectively, by heads 2 and 3. The shell and its accompanying heads may be constructed of any suitable material capable of withstanding the conditions of service to which it may be subjected and may, in some cases, be covered with suitable insulating material to reduce radiation heat losses. Within shell 1 and spaced therefrom is a second shell 4, closed at its lower end by head 5 and at its upper end by a plurality of louvers 6. In place of louvers 6 may be substituted perforate plate or suitable mesh material, when desired. Spaced from louvers 6 is a perforate plate 6' forming therewith a space within which is maintained a moving bed of filtering material.

During operation, when the apparatus is employed as a reactor, a fluid-like bed of finely divided catalytic material and hydrocarbon vapors 7 is maintained within the inner shell. Incoming hydrocarbon vapors and active catalyst particles to maintain bed 7 are introduced through line 8 and distributing cone 9. The spent catalyst particles are withdrawn through line 10. Above the turbulent fluid-like bed 7, within the inner shell, is a separation space 11 in which a relatively dispersed phase of reaction products and finely divided catalytic material is maintained.

Between the inner and outer shells 4 and 1 of the apparatus is dispersed a continuously moving compact bed of granular filtering material 12. The material comprising bed 12 should be of somewhat larger particle size than the catalytic material employed within the inner shell to promote the desired reaction. It may be a relatively non-friable inert material or of the same composition as the aforesaid catalyst. The incoming material to maintain bed 12 is supplied through line 13 and passes as a relatively compact downwardly moving bed across louvers 6 and through the annular space between shells 1 and 4. After passing downwardly through the apparatus, this filtering material is removed through line 14.

The effluent reaction products, containing finely divided catalyst particles from the inner shell, pass through louvers 6 and filtering bed 12, wherein the catalyst particles are removed and the substantially solid particle-free reaction products leave the reactor by means of line 15 to pass to subsequent fractionation and recovery equipment. The separated solid particles remain in the filtering material bed and are removed therewith from the reactor.

Figure 2:
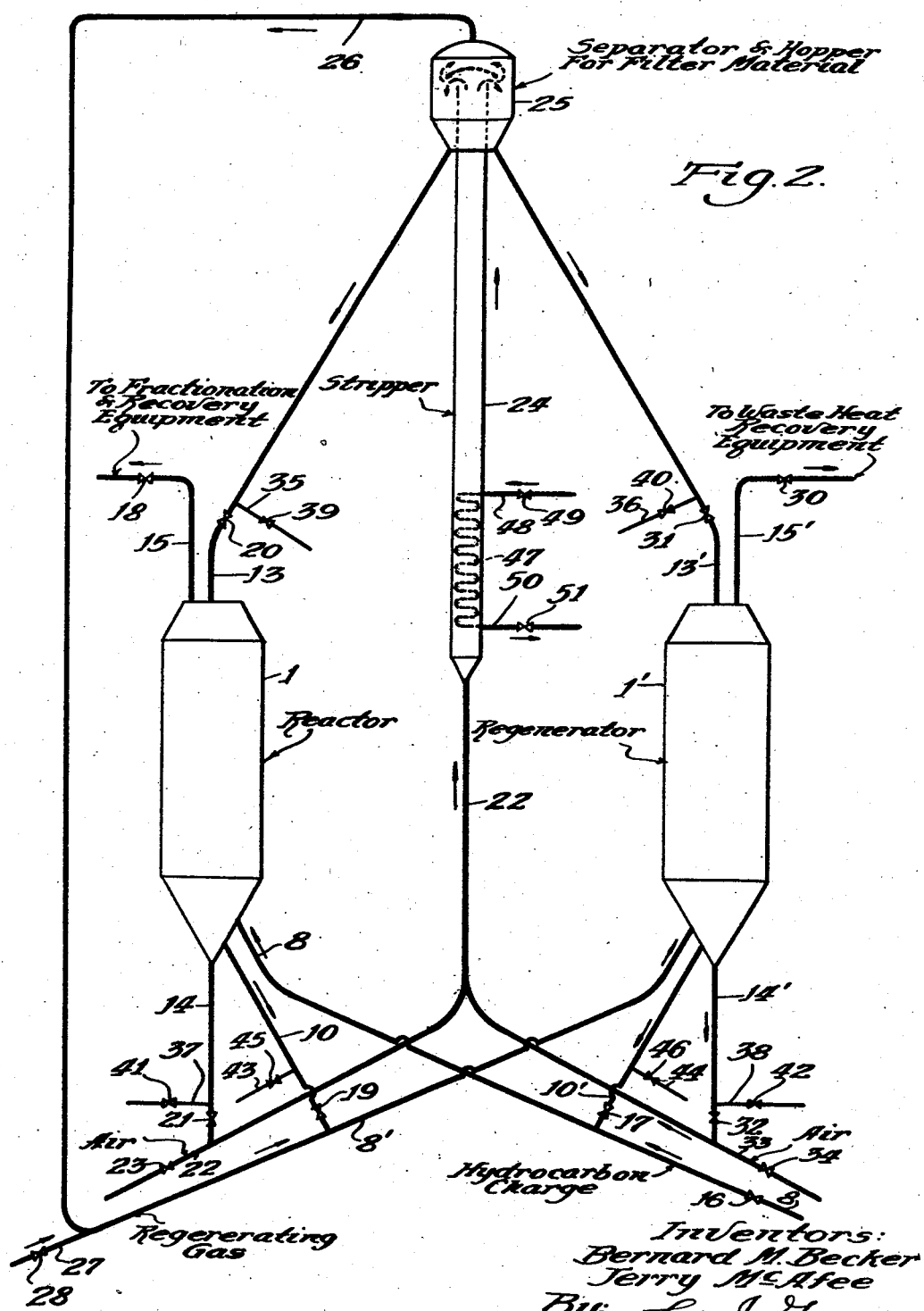
Fig. 2 is an elevational view illustrating a fluid bed type system such as employed, for example, in the catalytic cracking of hydrocarbon oils and in which the apparatus illustrated in Fig. 1 is employed for recovering catalyst fines from the effluent gases leaving the reactor and regenerator.

Referring now to Fig. 2, 1 and 1' denote respectively a reactor and regenerator in a system suitable for the catalytic cracking of hydrocarbons. Vessels 1 and 1' are similar in construction and are illustrated in more detail in Fig. 1; however, being used for a slightly different function in this system are designated by different characters. Reactor 1 is identical with and functions the same as the apparatus illustrated in Fig. 1. That is, it contains a fluid-like bed of hydrocarbon vapors and catalyst particles which is surrounded by a compact moving bed of filtering material.

The hydrocarbon charge is introduced to the system through line 8, controlled by valve 16, and it is commingled with freshly regenerated catalyst from line 10', controlled by valve 17. The effluent reaction products substantially free of solid particles leave the reactor through line 15, controlled by valve 18, to be directed to subsequent fractionation and recovery equipment.

The spent catalyst is removed through line 10, controlled by valve 19, and is commingled with regenerating gas in line 8' and directed into regenerator 1'. Granular filtering material is supplied to reactor 1 through line 13, controlled by valve 20, and the filtering material containing fine particles is removed through line 14, controlled by valve 21. The removed filtering material is commingled in line 22 with air, controlled by valve 23, and directed into stripper 24, wherein it is maintained in a fluid-like state and the fine particles removed therefrom by the stream of air.

The filtering material and air-containing fine particles are separated in hopper 25, the filtering material remaining in the hopper and the air-containing fine particles being removed through line 26 to be supplied to line 8' as a portion of the regenerating gas. When desired, additional regenerating gas may be supplied to the system through line 27, controlled by valve 28. The air and fines removed from the filtering material in stripper 24 and separator 25 are commingled with the spent catalyst from reactor 1 and directed into regenerator 1', wherein the regenerating gas and spent catalyst particles will form a fluid-like bed within the inner shell.

The carbonaceous material, previously deposited upon the catalyst in reactor 1, is removed in regenerator 1' by combustion with oxygen in the regenerating gas. The reactivated catalyst particles are removed from regenerator 1' by means of line 10'. The combustion products containing catalyst fines pass through a moving bed of compact filtering material similar to bed 12 in reactor 1, and the catalyst-free gases are removed from the regenerator by means of line 15' controlled by valve 30, and are directed to suitable waste heat recovery equipment as desired. Filtering material is supplied to regenerator 1' by means of line 13', controlled by valve 31, and the filtering material containing fines is removed through line 14', controlled by valve 32. The removed filtering material is commingled with air in line 33, controlled by valve 34, and directed into stripper 24 along with the filtering material and air passing through line 22.

Suitable blanketing gases such as steam or other inert fluids may be introduced to the various catalyst-carrying lines 13, 13', 14 and 14', respectively, by means of lines 35, 36, 37 and 38, controlled by valves 39, 40, 41 and 42. Suitable inert stripping fluids may be introduced to lines 10 and 10', respectively, by means of lines 43 and 44, controlled by valves 45 and 46.

In some instances, when it is desirable to remove heat from the filtering material, cooling coil 47 in stripper 24 may be utilized. Suitable cooling fluids may be introduced thereto by means of line 48, controlled by valve 49, and withdrawn therefrom by means of line 50, controlled by valve 51.

Figure 3:
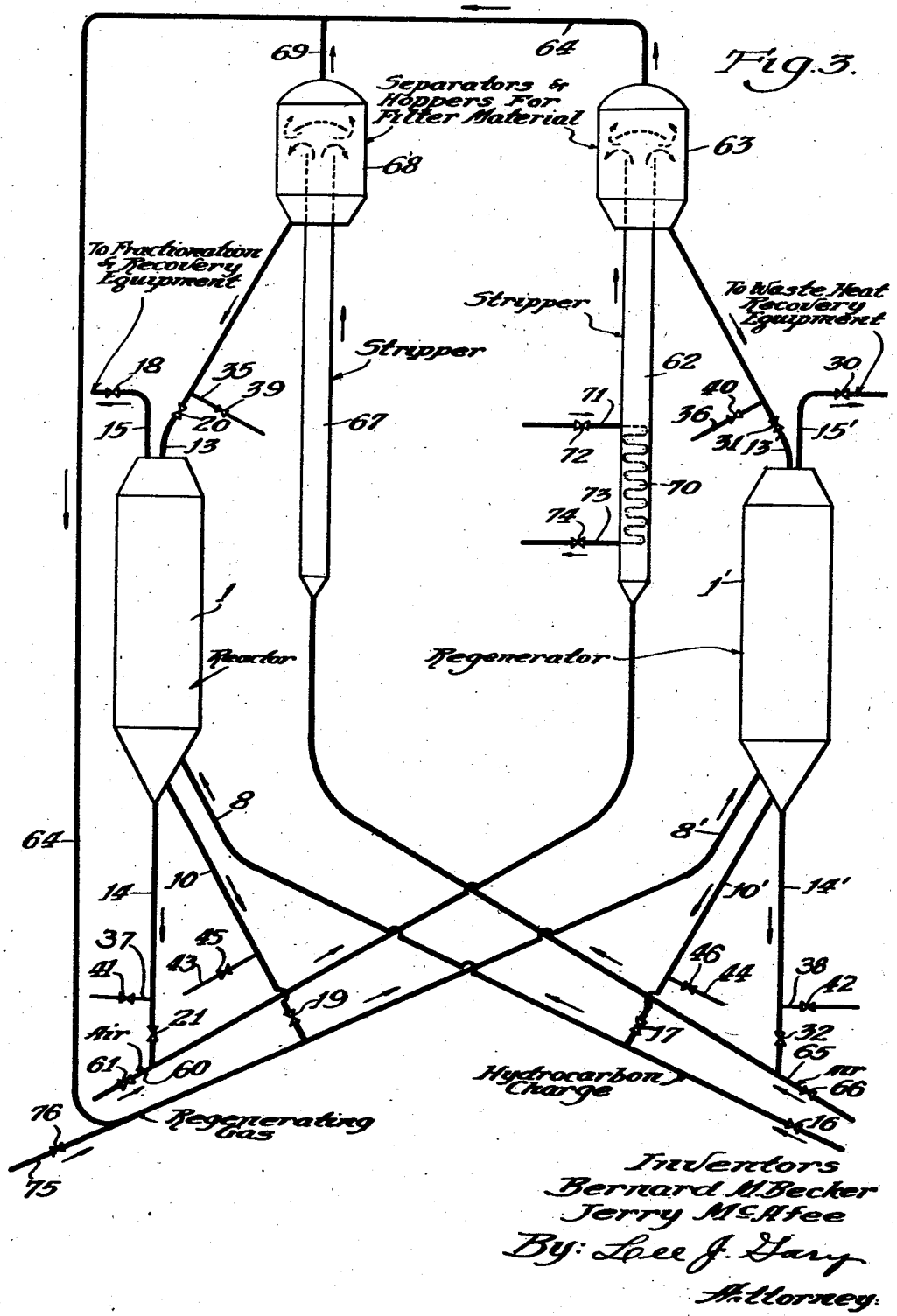
Fig. 3 is an elevational view illustrating an alternative arrangement of equipment suitable for the catalytic cracking of hydrocarbon oils.

Referring now to Fig. 3, reactor 1 and regenerator 1' and their respective inlet and outlet connections are the same as those illustrated in Figs. 1 and 2. However, the balance of the system is somewhat modified with respect to Fig. 2 in that separate strippers and separators are utilized for the filtering material employed in the two vessels.

A hydrocarbon charge is introduced to the system through line 8, controlled by valve 16, and is commingled with reactivated catalyst from line 10', controlled by valve 17. The catalyst containing hydrocarbons are supplied to reactor 1 by means of line 8 and the reaction products are removed through line 15, controlled by valve 18. The spent catalyst is removed through line 10, controlled by valve 19 and is commingled with regenerating gas in line 8' and passes into regenerator 1'. Effluent combustion products from the regenerator are withdrawn through line 15', controlled by valve 30, to be directed to suitable waste heat recovery equipment.

Filtering material is supplied to reactor 1 through line 13, controlled by valve 20, and is removed through line 14, controlled by valve 21. The withdrawn filtering material from reactor 1 is commingled with air in line 60, controlled by valve 61, and directed into stripper 62, wherein a fluid-like bed is maintained, facilitating removal of fines from the filtering material and the air stream containing fines is separated from the filtering material in separator hopper 63, the filtering material remaining in the hopper and the air stream being withdrawn through line 64. Separated filtering material in separator hopper 63 is then directed by means of line 13', controlled by valve 31, into regenerator 1'.

After passing therethrough and removing fines from the combustion products, the filtering material is removed through line 14', controlled by valve 32. The filtering material removed from the regenerator is commingled in line 65 with air, controlled by valve 66, and passes into a second stripper 67, wherein the stream of air removes fines from the filtering material and after passing through separator hopper 68, is withdrawn through line 69. The filtering material, substantially free of fines, remains in hopper 68 and is directed therefrom by means of line 13, controlled by valve 20, into reactor 1.

In some cases, it may be desirable to provide cool filtering material for the regenerator; for instance, in cases where the phenomenon of afterburning is encountered. This phenomenon results, it is thought, from the combustion of CO with excess oxygen in the upper or dispersed phase of the regenerator and considerably increases the temperature in this region. By introducing cool filtering material to this portion of the regenerator, this afterburning may be considerably reduced. When it is desirable to cool the filtering material being supplied to the regenerator, cooling coil 70 may be employed, suitable cooling fluid therefore being introduced through line 71, controlled by valve 72, and withdrawn therefrom through line 73, controlled by valve 74. The air stream containing fines from separator hoppers 63 and 68 may be sufficient, in many cases, to promote the desired combustion in regenerator 1', but in instances where this is not true, additional oxygen-containing gases may be introduced to the system through line 75, controlled by valve 76.

In some cases, instead of commingling the withdrawn filtering material from the reactor with air, it may be desirable to employ a vaporized portion of the charging oil and after stripping, return the suspended fine catalyst particles directly to the reaction zone.

By employing the present invention it is possible to eliminate cyclone separators and expensive Cottrel precipitators, thus saving a significant part of the cost of a fluid catalyst unit.

We claim:

1. In a process for the conversion of hydrocarbons while passing through a fluidized body of subdivided solid catalyst in a reaction zone, whereby a stream of gaseous reaction products discharged from the fluidized body contains suspended catalyst fines, and wherein contaminated catalyst is removed from said body and regenerated by burning combustible contaminants therefrom in a regenerating zone containing a fluidized body of catalyst particles, the method which comprises passing said stream of gaseous reaction products through a compact moving bed of solid particles coarser than said fines to separate suspended fines from said gaseous products, supplying the resultant mixture of coarser particles and fines to a stripping zone, passing an oxygen-containing gas through said mixture in the stripping zone to separate catalyst fines from the coarser particles, returning the latter to said compact bed, removing a suspension of catalyst fines in oxygen-containing gas from the stripping zone and introducing the suspension to the fluidized body of catalyst particles in said regenerating zone.

2. The process of claim 1 further characterized in that a stream of gaseous combustion products containing suspended catalyst fines is discharged from said fluidized body in said regenerating zone, said stream of gaseous combustion products is passed through a separate compact moving bed of solid particles coarser than said fines to separate suspended fines from said combustion products, the resultant separate mixture of coarser particles and fines is supplied to said stripping zone along with said first named mixture, and coarser particles freed of said fines in said stripping zone are returned to each of said compact beds.

3. An apparatus for contacting a fluid with finely divided solid particles which comprises an outer chamber, a fluid outlet from the upper portion of said outer chamber, a solid particle outlet from the lower portion of said outer chamber, an inner chamber spaced from said outer chamber and containing a plurality of openings in the upper portion thereof whereby to provide fluid passageways between said inner chamber and the upper internal portion of said outer chamber, a fluid inlet to the lower portion of said inner chamber, a solid particle outlet from the lower portion of said inner chamber, a perforated partitioning member disposed within the upper portion of said outer chamber, said member being spaced from and surrounding the upper portion of said inner chamber, and a solid particle inlet to the space defined between said partitioning member and the upper portion of said inner chamber.

BERNARD M. BECKER.
JERRY McAFEE.

REFERENCES CITED

The following references are of record in the file of this patent:

UNITED STATES PATENTS

| Number | Name | Date |
|---|---|---|
| 1,549,680 | Nordstrom | Aug. 11, 1925 |
| 2,302,209 | Goddin, Jr. | Nov. 17, 1942 |
| 2,327,175 | Conn | Aug. 17, 1943 |
| 2,411,208 | Hall et al. | Nov. 19, 1946 |

FOREIGN PATENTS

| Number | Country | Date |
|---|---|---|
| 91,075 | Sweden | Dec. 21, 1937 |